United States Patent [19]
Kojima et al.

[11] 3,991,296
[45] Nov. 9, 1976

[54] APPARATUS FOR FORMING GROOVES ON A WAFER BY USE OF A LASER

[75] Inventors: Yoshitomo Kojima; Hiroshi Suga, both of Tokyo, Japan

[73] Assignee: Nippon Electric Company, Ltd., Tokyo, Japan

[22] Filed: Nov. 12, 1975

[21] Appl. No.: 631,217

[30] Foreign Application Priority Data
Nov. 15, 1974  Japan............................. 49-131192

[52] U.S. Cl. ................................ 219/121 L; 29/583
[51] Int. Cl.² .......................................... B23K 27/00
[58] Field of Search .... 219/121 L, 121 LM, 121 M; 331/94.5 R; 29/583, 588

[56] References Cited
UNITED STATES PATENTS

| | | |
|---|---|---|
| 3,028,469 | 4/1962 | Bognar............................ 219/59 X |
| 3,118,406 | 1/1964 | Stanton............................. 219/59 X |
| 3,560,258 | 2/1971 | Brisbane................. 219/121 LM X |
| 3,768,157 | 10/1973 | Buie......................... 219/121 LM X |
| 3,816,700 | 6/1974 | Weiner et al.................... 219/121 L |
| 3,850,698 | 11/1974 | Mallozzi et al............. 219/121 L X |
| 3,866,398 | 2/1975 | Vernon, Jr. et al......... 219/121 L X |

*Primary Examiner*—J. V. Truhe
*Assistant Examiner*—G. R. Peterson
*Attorney, Agent, or Firm*—Hopgood, Calimafde, Kalil, Blaustein & Lieberman

[57] ABSTRACT

An apparatus for forming grooves in a semiconductor wafer by the use of a laser beam includes a movable stage on which the wafer is mounted and a transparent member mounted on the stage in a sealed manner and covering the wafer. A liquid is introduced into the space defined between the wafer and the transparent member.

4 Claims, 4 Drawing Figures

APPARATUS FOR FORMING GROOVES ON A WAFER BY USE OF A LASER

This invention relates to apparatus for forming grooves on a wafer by using a laser beam, and more particularly to apparatus for scribing a semiconductor wafer to divide the wafer into individual chips associating integrated circuits or circuit elements such as transistors.

It is known to divide a semiconductor wafer into a number of chips by scribing the wafer with a diamond scriber and pressing the wafer locally by a roller or the like to break it up into chips. This method, however, has numerous drawbacks; for example, scribing is limited to one direction and hence is very inefficient, a continuous scribing line is not available unless the wafer surface is smooth enough, and the grooves formed are not deep enough to divide the thick wafer. To solve these problems, a scribing apparatus using a laser beam has recently been proposed, in which a laser beam of a given output level is applied directly to the semiconductor wafer which is held on a stage by vacuum adsorption, and the wafer surface is scribed or grooved by the laser beam as the wafer is moved. With this apparatus, the scribing speed is increased and the continuity of the scribed line is achieved. Moreover, the wafer is scribed deeply.

This prior art, however, is disadvantageous in that molten semiconductor debris is scattered during scribing and adheres to the chip surface on the wafer. The minute semiconductor debris that adheres to electrodes or metal wiring on the chip will deteriorate the electrical properties of the chip or ruin the function of the integrated circuit. Improvements in the laser beam scribing apparatus have included use of a vacuum absorber for absorbing the semiconductor debris scattered and ultrasonic washing of the scribed wafer for washing out the semiconductor debris adhered to the water after the scribing process. In practice, however, the vacuum absorber is not capable of thoroughly removing the semiconductor debris because the debris is of very high temperature and readily fuses to the wafer surface. Furthermore, according to the ultrasonic-washing method, the wafer is very likely to be cracked along the scribed groove during washing. This makes the ultrasonic-washing method impracticable when the wafer is thin or scribed deeply. Another approach to the improvement has been to form a wax coating on the wafer surface to be laser-scribed. This method, however, poses another problem — the wax burns due to the high temperature debris and the removal of the wax requires a large amount of chemicals and additional process steps. The use of chemicals can cause a further problem of contamination of the chip and deterioration of the electrical characteristics of the device.

It is therefore a principal object of the invention to provide a wafer scribing apparatus using a laser beam, which is capable of preventing the minute scattering debris from being fused to the wafer surface.

It is another object of the invention to provide a semiconductor wafer scribing apparatus using a laser beam, which is capable of preventing the minute scattering debris from being fused to the surface of the semiconductor wafer to be broken into a number of chips.

The wafer grooving apparatus according to one aspect of the invention includes a stage movable at least in one direction, and means for holding a wafer on the stage. A transparent member covers the wafer and is mounted on the stage liquid-tightly and with a space between the wafer and the transparent member. A transparent liquid which is harmless to the wafer is introduced in the space between the wafer and the transparent member, and a source of a laser beam is located above the transparent member. In operation, the wafer is held on the stage and covered with the transparent member, and the space between the wafer and the transparent member is filled with a harmless liquid such as water, followed by the irradiation of the laser beam on predetermined areas of the wafer surface through the transparent member and the liquid. The stage is moved with respect to the laser beam to form grooves on the wafer.

The semiconductor wafer scribing apparatus according to another aspect of the invention includes a stage movable in opposite directions, and means for carrying a semiconductor wafer on the stage. A transparent cover for the semiconductor wafer is mounted on the stage water-tightly and a space is formed between the wafer and the transparent cover and a harmless liquid such as water is passed through the space between the wafer and the transparent cover. A laser beam source is located above the transparent cover. In operation, a semiconductor wafer is mounted on the stage and covered with the transparent cover, and water is made continuously to flow through the space between the wafer and the cover. The laser beam is irradiated onto predetermined areas of the wafer surface through the transparent cover and the flowing water as the stage is being moved, and thereby the semiconductor wafer is scribed.

In the apparatus of the invention, therefore, the high temperature debris produced while scribing are instantly cooled by the water which is kept in contact with the wafer surface to permit the debris to be simply deposited on the wafer surface without fusing and hence to be readily removed by washing. In other words, the apparatus of the invention scribes a semiconductor wafer which incorporates a large number of chips without affecting the electrical properties of the individual chips. Furthermore, with the wafer scribing apparatus of the invention, a wafer can be reliably scribed irrespective of the surface condition and even a thin wafer can be scribed without causing the wafer to be cracked during washing. Thus the invention makes it possible to scribe not only a thick semiconductor wafer having chips of large size, but also a thin semiconductor wafer having chips of small size such as $0.16mm^2$, without damaging any chip when the wafer is divided into individual chips.

The above and other objects and features of the invention will become apparent from the following description taken in conjunction with the accompanying drawings; wherein.

Figure 1:
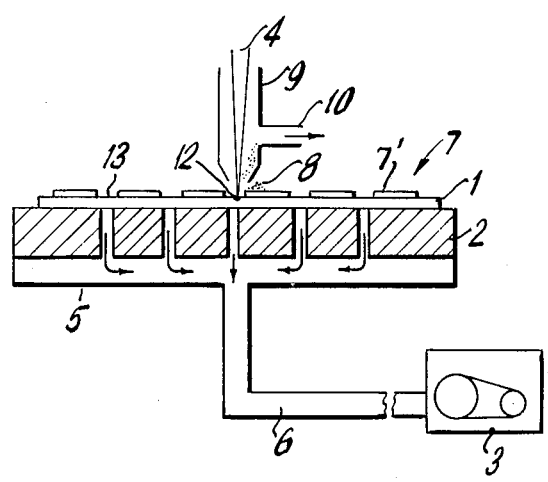
FIG. 1 is a sectional view showing a portion of a prior art semiconductor wafer scribing apparatus using a laser beam.

FIG. 1 illustrates a prior art semiconductor wafer scribing apparatus which comprises a stage 2 having a plurality of suction holes 5, and a vacuum pump 3 connected to the suction holes 5 through a tube 6. A semiconductor wafer 1 having a plurality of chips 7 with metal leads 7' is placed on the suction holes 5 on the stage 2. The wafer 1 is retained in position when the vacuum pump 3 is operated. A laser beam 4 from a laser light source (not shown) is focused on a scribing line 13 on the semiconductor wafer 1 through a duct 9. The duct 9 has a bypass 10 which is connected to a suction pump (not shown). The suction pump draws out through the bypass 10 the debris 8 which are scattered when a groove 12 is formed by scribing under the application of the laser beam 4.

In this prior art apparatus, the laser beam 4 is controlled to be focused on the scribing line 13 on the wafer 1. At the same time, the stage 2 is moved in a direction perpendicular to the plane of the drawing, to form a groove 12. Then the stage 2 is moved in a direction parallel to the plane of the drawing to make the wafer ready to be scribed for another groove 12. When all scribing lines 13 are grooved, the stage 2 is rotated through an angle of 90° and the wafer is scribed in the same manner as described above in a direction perpendicular to the above mentioned scribing line 13. The crossing grooves formed thereby wash out ultrasonically the scattered debris 8 on the wafer surface and divide the chips from each other.

Although some high temperature debris 8 produced during scribing are carried away through the bypass 10, most of the debris fall on the nearby chips and are fused thereto due to the high temperature of the debris. Only a small amount of the fused debris is washed out in water even under the application of ultrasonic waves. The ultrasonic waves must be strong enough to thoroughly remove the fused debris, causing the semiconductor wafer, if it is thin or grooved deeply, to be cracked along the grooves. This poses processing difficulties in the succeeding steps. In a practical wash-out process, it is virtually impossible to remove every piece of once fused debris 8, resulting in a considerable number of defective chips.

Figure 3:
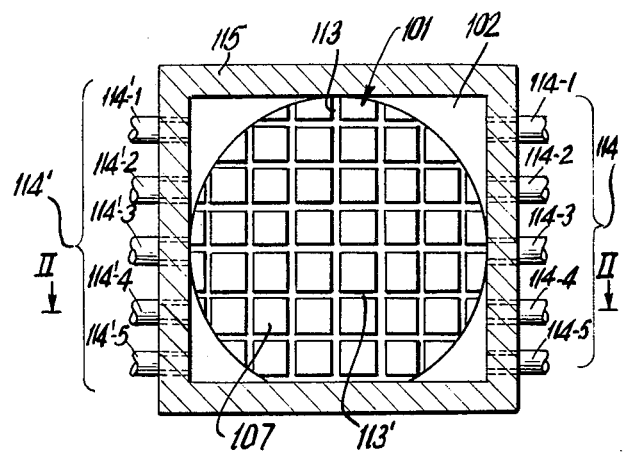
FIG. 3 is a plan view showing the stage and the cover member of the apparatus of FIG. 2.
Figure 2:
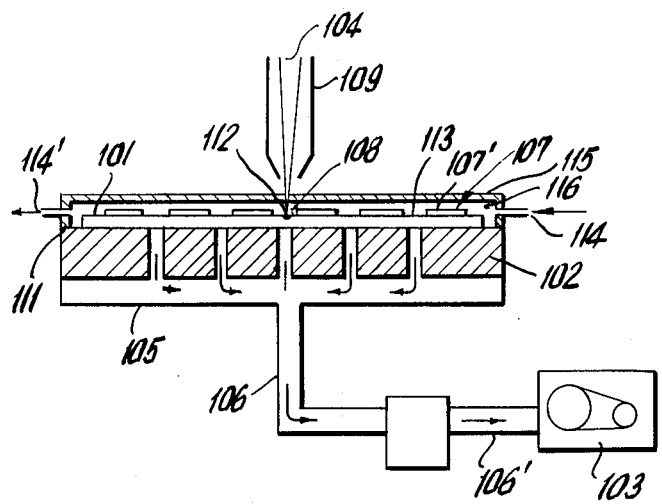
FIG. 2 is a sectional view taken across line II—II of FIG. 3, showing a portion of a semiconductor wafer scribing apparatus using a laser beam according to an embodiment of the present invention.

To overcome this deficiency of the prior art, the wafer scribing apparatus of the invention as illustrated in the embodiment thereof shown in FIGS. 2 and 3, the semiconductor wafer scribing apparatus comprises a stage 102 and a transparent member 115 which covers the stage 102. The space between the transparent member 115 and the stage 102 is to be filled with water 116 flowing therethrough. The stage 102 has a plurality of suction holes 105 which are connected to a vacuum pump 103 through tubes 106 and 106' and a water removing trap 117. A semiconductor wafer 101 is retained on the suction holes 105 on the stage 102 by the suction force exerted from the vacuum pump 103. The semiconductor wafer 101 is, for example, formed of silicon having about 50 mm in diameter and about 200 $\mu$m in thickness, on which a plurality of semiconductor devices with metal electrodes 107' are formed at respective areas to be divided as chips 107 along scribing lines 113 and 113'. The cover member 115, which may be made, for example, of quartz glass, is installed water-tightly on the stage 102 by the use of a mounting jig 111, with a space being left between the wafer 101 and the cover member 115. The cover member 115 may be made of any other transparent material such as hard glass, lead glass or potash glass, instead of quartz glass, which allows the laser beam to pass through with a minimum attenuation. The thickness of the cover member 115 may be 2mm as in this example, and is preferably from 1 to 3mm due to its mechanical strength and the transmissivity of the laser beam. The water 116 is introduced into the space between the cover member 115 and the surface of the stage 102 through inlet ports 114 and is withdrawn therefrom through outlet ports 114'. The distance from the surface of the semiconductor wafer 101 to the cover member 115 is 1.0 mm in this example and should preferably be between 0.3 and 2.0 mm. The water 116 is desirably clean and of high purity and has preferably been thoroughly deaerated and deionized. The water 116 must contain no bubbles nor dirt particles as these may cause the laser beam to be refracted and misfocused or may contaminate the semiconductor device. The water 116 is replaceable by any other transparent liquid. However, distilled water would be best in view of its low cost, ease of handling, avoidance of contamination, safety, and other aspects. The space between the cover member 115 and the stage 102 must be completely filled with water 116. Otherwise, the laser beam is refracted at the surface of the water, and the water surface which is varying with the flow of water hampers the laser beam from being focused into position. Furthermore, the water heated by the laser beam evaporates and is condensed into drops of water on the back of the cover member 115, which refract the laser beam.

The inlet and outlet ports 114, 114' may be arranged as shown in FIG. 3 in which five inlet ports 114-1 to 114-5 and five outlet ports 114'-1 to 114'-5 are equipped on opposite sides of the cover member 115 so as to allow the water 116 to flow uniformly over the semiconductor wafer 101. Even if the uniform flow of water could not be maintained, numerous air bubbles deaerated from the water would be accumulated at the slowly flowing portion at the edges of the wafer 101. So long as the uniformity of the water flow is maintained, various arrangements of the inlet and/or outlet port are possible. One example of such arrangements is the use of one wide port having a single wide opening at the greater part of the edge of the cover member 115, as the inlet and/or outlet port. Another example is the use of a plurality of ports having openings of different sizes as shown in FIG. 4.

Figure 4:
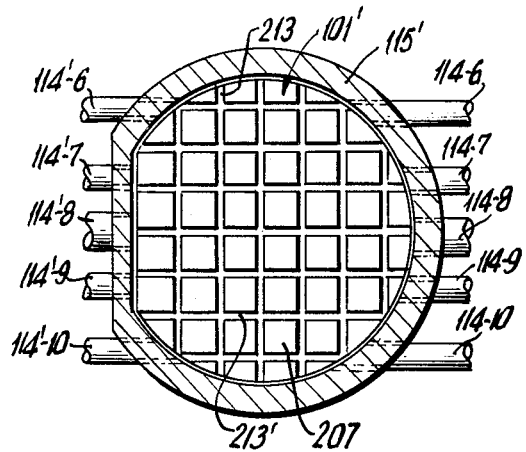
FIG. 4 is a plan view of another example of the stage that may be used in the wafer scribing apparatus of FIG. 2.

In the embodiment of FIG. 4, a cover member 115' has the same shape as the semiconductor wafer 101'. Inlet ports 114-6 to 114-10 and outlet ports 114'-6 to 114'-10 are installed with the opposite side walls of the cover member 115'. The ports 114-8 and 114'-8 located at the center have a bigger diameter than the others to make the improved uniformity of the water flow over the semiconductor wafer 101' which have semiconductor devices formed in respective chip areas 207 surrounded by scribing lines 213, 213'.

Referring again to the embodiment of FIGS. 2 and 3, the source (not shown) of a laser beam 104 is located above the cover member 115, and the laser beam 104 is focused on the surface of the semiconductor wafer 101 through a duct 109. In this apparatus, it is not necessary to provide the duct 109 with a vacuum absorber for absorbing silicon debris 108. The laser beam 104 can be derived from any known neodymium laser oscillator using neodymium-YAG, neodymium-YAD or the like as a host material. Such neodymium laser emittes a beam having a wave length of about 1.06 micron. A laser beam having a wave-length more than 10 microns is generally not suitable for this application.

This wafer scribing apparatus of the invention is operated in the following manner. The semiconductor wafer 101 is placed on the stage 102 and is fixedly retained in position by the suction force exerted from the vacuum pump 103 through the suction holes 105 and tubes 106 and 106'. The cover member 115 is water-tightly installed on the stage 102 by the use of the jig 111, and distilled water 116 is introduced thereinto through the inlet ports 114-1 to 114-5. The water 116 is preferably kept flowing such as at a velocity of 2.0 meters/sec during the application of the laser beam 104, although the water 116 may be kept still, provided the water is not boiled by the laser beam. The above flowing velocity should be established within the range between 1.5 and 4.5 meters/sec. The laser oscillator (not shown) is controlled so that the laser beam 104 is focused on the scribing line 113 on the semiconductor wafer 101. At the same time, the stage 102 is moved in the direction of the scribing line 113 at a speed of between 15 and 100 mm/sec, preferably 50 mm/sec. When this scribing is completed, the stage 102 is moved along another scribing line next to the scribing line 113. This procedure is repeated until all the parallel scribing lines are traced by the laser beam 104. Then the stage 102 is rotated through an angle of 90°, and the wafer is scribed in the same manner as described above along parallel scribing lines 113' perpendicular to the scribing lines 113, whereby grooves 112 are formed in a matrix on the wafer 101. Silicon debris 108 of a high temperature which are scattered as the wafer is scribed is quickly cooled by the water 116; the cooled debris 108 is simply deposited on the semiconductor wafer 101. The peak power of the laser oscillator is preferably selected to 5KW at a repetition frequency of 6 KHz. The applicable peak power is different with the repetition frequency but may be desirably in the range between 1.0KW and 8KW in general.

After the scribing operation, the semiconductor wafer 101 is withdrawn from the scribing apparatus and washed in pure water. The debris 108 can be thoroughly removed from the wafer surface by the pure water flowing on the wafer surface. If necessary, weak ultrasonic waves having a power of one-eighth of the power applied in the conventional washing process may be applied during washing. In this process, because no appreciable amount of stress is applied to the semiconductor wafer 101, the wafer 101 is not cracked along any scribing lines 113, 113'. In practice, for example, a semiconductor wafer as thin as 160 μm can be washed without cracking the semiconductor wafer.

Preferred embodiments of the invention have been described above, in which a semiconductor wafer is scribed. The apparatus of the invention is applicable not only to semiconductor wafers but also to glass, ceramic and metal wafers in splitting them into chips or forming a grooved pattern on the surface thereof. In any application, debris can be substantially, if not completely, removed by a simple washing without affecting the property of the wafer.

Thus, whereas the wafer scribing apparatus of the invention has been herein specifically described with respect to several embodiments thereof, it will be appreciated that variations may be made therein without necessarily departing from the spirit and scope of the invention.

What is claimed is:

1. An apparatus comprising a stage movable at least in one direction, means for holding a wafer on said stage, a transparent member covering said wafer, means for sealedly mounting said transparent member on said stage, a space being defined between the wafer and said transparent member, means for filling said space with a transparent liquid which is harmless against the wafer, and a source of a laser beam located above said transparent member; wherein the wafer is held on said stage and covered with said transparent member, and said space between the wafer and said transparent member is filled with a transparent liquid followed by the irradiation of said laser beam to predetermined surface areas of the wafer through said transparent member and the transparent liquid with movement of said stage to make grooves on the wafer.

2. The apparatus of claim 1, in which said filling means includes a liquid inlet port and a liquid outlet port, and means for causing the transparent liquid to flow at a velocity of between 1.5 and 4.5 meters/sec during the irradiation of said laser beam.

3. A semiconductor wafer scribing apparatus using a laser beam comprising a stage movable at least in opposite directions, means for carrying a semiconductor wafer on said stage, a transparent cover for said semiconductor wafer, means for sealedly mounting said transparent cover on said stage, a space being formed between the wafer and said transparent cover, means for passing a liquid through said space between the wafer and said transparent cover, and a laser beam source located above said transparent cover, wherein the semiconductor wafer is mounted on said stage and covered with said transparent cover, and a liquid is made continuously to flow through said space between the wafer and said transparent cover followed by the irradiation of said laser beam to predetermined areas of the semiconductor wafer surface through said transparent member and liquid with movement of said stage to scribe the surface of the semiconductor wafer without fusing semiconductor debris to the semiconductor wafer.

4. A semiconductor wafer scribing apparatus of claim 3, wherein said liquid passing means includes a water inlet port and a water outlet port, and means for causing the liquid to flow at a velocity of between 1.5 and 4.5 meters/sec during the irradiation of said laser beam.

* * * * *